US010040006B2

(12) United States Patent
Eberly et al.

(10) Patent No.: US 10,040,006 B2
(45) Date of Patent: Aug. 7, 2018

(54) BAG FILTER APPARATUS FOR FILTERING FLUIDS

(71) Applicant: PARK TEQ, LLC, Houston, TX (US)

(72) Inventors: Christopher Nolan Eberly, Chappell Hill, TX (US); Tim Brashear, Cypress, TX (US)

(73) Assignee: PARK TEQ, LLC, Houston, TX (US)

( * ) Notice: Subject to any disclaimer, the term of this patent is extended or adjusted under 35 U.S.C. 154(b) by 235 days.

(21) Appl. No.: 15/172,799

(22) Filed: Jun. 3, 2016

(65) Prior Publication Data
US 2017/0348619 A1 Dec. 7, 2017

(51) Int. Cl.
*B01D 29/11* (2006.01)
*B01D 35/143* (2006.01)
*B01D 29/27* (2006.01)

(52) U.S. Cl.
CPC ............ *B01D 29/27* (2013.01); *B01D 29/11* (2013.01); *B01D 35/143* (2013.01); *B01D 2201/0446* (2013.01); *B01D 2201/48* (2013.01)

(58) Field of Classification Search
None
See application file for complete search history.

(56) References Cited

U.S. PATENT DOCUMENTS

| 5,820,762 | A | 10/1998 | Bamer et al. | |
|---|---|---|---|---|
| 6,132,626 | A * | 10/2000 | Hart | B01D 29/01 210/108 |
| 6,334,953 | B1 | 1/2002 | Singleton | |
| 6,468,421 | B2 | 10/2002 | Huckestein | |
| 6,755,879 | B2 | 6/2004 | Watvedt | |
| 7,128,832 | B2 | 10/2006 | Wade | |
| 7,540,953 | B2 | 6/2009 | Fitzgerald | |
| 8,715,491 | B2 * | 5/2014 | Shaw | E03F 5/041 210/163 |
| 8,926,836 | B2 | 1/2015 | Takai | |
| 2010/0037962 | A1 | 2/2010 | Ryan et al. | |
| 2010/0199574 | A1 | 8/2010 | Perlatti | |
| 2013/0180929 | A1 * | 7/2013 | Kowalsky | B01D 35/1573 210/744 |

* cited by examiner

*Primary Examiner* — Krishnan S Menon
(74) *Attorney, Agent, or Firm* — Egbert Law Offices, PLLC

(57) ABSTRACT

An apparatus for filtering fluid has a container, a platform positioned in the interior volume of the container in a location above a bottom of the container, and a bag filter extending through a hole in the platform. The bag filter has an inlet and an outlet. The inlet is positioned at or above a top surface of the platform and an outlet positioned below the top surface of the platform such that a fluid passing through the fluid inlet of the container flows into the inlet of the bag filter and outwardly of the outlet of the bag filter so as to flow toward the fluid outlet of the container. A retainer plate is positioned over the platform and has an orifice opening to the inlet of the bag filter.

18 Claims, 3 Drawing Sheets

BAG FILTER APPARATUS FOR FILTERING FLUIDS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to bag filters. More particularly, the present invention relates to bag filters as used for the filtering of particulate-containing wastewater or rainwater. More particularly, the present invention relates to below-grade or sub-grade vaults that are used for collecting water discharges and for filtering such water discharges prior to passing the filtered water to another container or location.

2. Description of Related Art Including Information Disclosed Under 37 CFR 1.97 and 37 CFR 1.98

Rainfall is variable from place to place. Some locations, such as deserts, have infrequent rainfalls. When weather conditions finally bring moisture to these locations, the precipitation is often violent. The dry ground in these locations, such as an area made of sand, is in capable of absorbing and retaining locally-needed water. Rain transits through the drier area and returns to a drought condition quickly. Further, as a consequence of its recent evaporation, rainwater is often free of debris and pollution and may be useful water for human consumption or for auxiliary uses, such as for gardening or collection in a pool.

Rain collection system serve as a surge protection mechanism during large storm events. They provide a means of retaining (or "banking") rainwater runoff following a storm, thereby reducing the amount of untreated storm water that enters area lakes and rivers. The increased water retention can also reduce the amount of standing water that accumulates on streets throughout a community when the rainfall exceeds the combined storm sewer capacity, which can help control mosquito populations. Further, water banked in the systems can be used for gardening, filling in pools, or even washing cars, thus reducing the capacity requirements on municipal water systems.

Environmental impacts of excess rainwater can be mitigated using rain collection systems. In many municipalities, the local watershed groundwater tables are not adequately recharged because the municipality discharges the rainwater along with the treated sewage. The rainwater is then conveyed away from the municipality, losing an important input to the local watershed. The ecosystem can be severely impacted by the dirt, debris, chemicals, and other pollutants that are picked up when storm water flows across various surfaces where contaminants are commonly found. Therefore, municipalities or individuals can either spend money to treat rainwater (along with effluent) and then discharge the treated water remotely from its source or allow contaminated rainwater to negatively impact the quality of the local ecosystem.

Additionally, the filtering of water can also be required in a variety of other uses. For example, in various wastewater treatment systems, it is desirable to collect the particulate matter found in the fluid prior to passing the remaining wastewater as a stage to a water purification systems. Other circumstances occur where particulate matter is released with water in association with mechanical washdowns, such as the washing of airplanes, cars, helicopters, and various vehicles. Additional, particulate matter is desired to be removed when filtering the effluent water resulting from metal mills. As such, it is important to be able to provide a system that can effectively collect and retain solids from the solids-containing fluid. Additionally, it is desirable to provide such a system whereby the filters can be easily removed or replaced when such filters reach a capacity condition.

Bag filters for separating solid particles from a liquid flow can be used alone or in combination with other filters or devices. The bag filter can be formed of a fiberglass material or synthetic material. The filter material can be woven or non-woven. A bag filter may consist of one or more materials. The bag filter may be constructed in layers in which each layer is formed of a homogenous material of distinct properties. The desired properties of the bag filter can result properties of the layers of materials together. The bag filter can also have a progressive structure in which the properties of the bag filter change gradually and suitably through the filter wall. For example, the filter material can have gradually decreasing pore sizes in the downstream direction of the fluid flow such that the bag filter becomes gradually tighter and can trap particles of gradually smaller sizes. Bag filters are often known as "basket filters". Conventional bag filters will have a flange at the upper end thereof that can be secured to another structure such that the fluid will flow through an inlet of the bag and outwardly through an outlet of the bag. The outlet of the bag consists of the various pores, openings, slots, and other apertures that are formed in the sides or walls of the bag filter.

In the past, various patents have issued relating to devices for filtering fluid, such as water, and for the use of bag filters in the filtration of fluids. An early patent is found in U.S. Pat. No. 407,854, issued on Jul. 30, 1889 to J. Dornbirer. This patent describes a filter for rainwater which includes filtering devices supplied from a receiving basin in the upper end of a stand-pipe. An overflow-basin extends around the top portion of the stand-pipe and extends above the same. A dependent strainer/tube extends from the bottom of the basin. A waste pipe extends from the overflow basin. The stand-pipe has one or more filtering bags suspended therein. A strainer tube is suspended within the bag or bags and is provided with a receiving basin in its top.

U.S. Pat. No. 5,820,762, issued on Oct. 13, 1998 to Bamer et al., discloses a filter insert for a storm drain. In particular, this is the type of storm drain or sanitary sewer inlet that is found in factory or warehouse floors, parking lots and car washes. The insert holds one or more bags of the filter media. The bags have a very open structure, such as a coarse weave cotton, which permits water entering the drain to pass through each bag and the filter media within the bag. The entire bag can be withdrawn from the insert or replaced as the filter media becomes saturated. The filter bag contains an absorbent cellulose particulate media which absorbs oils, greases and non-volatile hydrocarbons. A second bag contains specially-textured activated carbon which absorbs organically bound heavy metals and volatile hydrocarbons, as well as volatile organic compounds.

U.S. Pat. No. 6,334,953, issued on Jan. 1, 2002 to R. Singleton, describes a storm water drainage filter assembly which is mounted on the discharge end of an outlet pipe of a storm water drainage system for filtering and collecting silt, dirt and other debris from runoff water flows. The filter assembly includes a collar member mounted within the discharge end of the outlet pipe and a filter bag that is removably attached to a downstream end of the collar member. The water flow is discharged from the outlet pipe of the storm water drainage system and is channeled through the filter bag. The filter bag filters and collects the sediment and debris therefrom while enabling the substantially cleaned runoff water to pass through the filter bag for drainage into a stream, pond or other water source.

U.S. Pat. No. 6,468,421, issued on Oct. 22, 2002 to J. E. Huckestein, discloses a filtering assembly for removing particles from a liquid. The filtering assembly is positioned coaxially within a vertical, pressure-tight housing having a tangential inlet at an upper end and an outlet at a bottom end thereof. The filtering assembly includes a filter bag positioned on the exterior surface of a perforated cylinder. Untreated liquid from the inlet is filtered as it flows radially inwards through the filter assembly. A wash-down device is positioned at an upper end of the housing for removing solids that have built-up on the exterior surface of the filter bag.

U.S. Pat. No. 6,755,879, issued on Jun. 29, 2004 to J. Watvedt, shows a bag filter device which enables collection and draining of particles of liquid from a gas flowing through the bag filter. The filter material of a lower portion and a continuation of the lower portion of the bag filter is formed, in its entirety, by a liquid-tight material. The bottom portion is provided with a liquid outlet so that the liquid separated can collect and be drained from the bag filter.

U.S. Pat. No. 7,540,953, issued on Jun. 2, 2009 to J. Fitzgerald, teaches an integrated below-ground vault with a filtered catch basin which allows runoff water to enter the vault by passing through a replaceable filter before being transferred to the sewer. A cavity is provided below the device that is filled with a drain gravel. A layer of filter cloth is placed over the drain gravel.

U.S. Pat. No. 7,128,832, issued on Oct. 31, 2006 to R. G. Wade, describes a filter pit. The pit has an inlet and an outlet adjacent a base of the pit. A primary, a secondary, and a tertiary filter are located between the inlet and outlet. The tertiary filter is supported above the base and is able to dry out when the flow of water through the pit ceases.

U.S. Pat. No. 8,926,836, issued on Jan. 6, 2015 to S. Takai, shows a rainwater filtering device for an inflow path. A water-permeable tubular body extends vertically in the middle of a vertical pipe located immediately below a position at which the rainwater flows into the rainwater-containing section. A bag-like filter having an open upper end and a closed lower end is contained in the tubular body part and covers an outer side of the tubular body. The bag-like filter captures dust in the rainwater while allowing the rainwater to pass through the bag-like filter. A mounting and dismounting means is provided to the vertical tube in order to dismount the tubular body and the filter from the vertical pipe and mount the tubular body in the filter to the vertical pipe.

U.S. Patent Application Publication No. 2010/0037962, published on Feb. 18, 2010 to Ryan et al., teaches a rainwater storage and distribution system. This storage system includes a temporary storage capacity using a disposable flexible bag acting as a container to capture and collect rainwater and alleviate burdens on municipal water treatment works. The bag is protected in a foldable structure. The structure allows for a distant overflow feature, a locking mechanism, filters, debris protection, and easy access for removal of the bag. A rigid backboard can also slide into the bag to alleviate strain on the support structure.

U.S. Patent Application Publication No. 2010/0199574, published on Aug. 12, 2010 to D. Perlatti, provides a system and method for collecting rainwater. A downspout interface bladder is removably attached to an end section of a downspout. A rainwater holding device is hydraulically couplable to the downspout interface bladder.

It is an object of the present invention to provide a filtering apparatus that effectively filters particulate matter from fluids.

It is another object of the present invention to provide a filter apparatus that senses that the filter is clogged or substantially full.

It is another object the present invention to provide a filtering apparatus that allows for adjustable removal of first flush solids and liquids.

It is another object of the present invention to provide a filtering apparatus that can be used in a progressive treatment system.

It is another object of the present invention provide a filter apparatus that allows bag filters to be easily secured and removed.

It is a further object of the present invention to provide a filtering apparatus that can be used so as to treat rainwater, and other particulate-containing fluids, in a sub-grade location.

It is still further object of the present invention provide a filter apparatus that is easy to use, easy to manufacture and relatively inexpensive.

These and other objects and advantages of the present invention will become apparent from a reading of the attached specification and appended claims.

BRIEF SUMMARY OF THE INVENTION

The present invention is an apparatus for filtering water that comprises a container having a fluid inlet, a fluid outlet and an interior volume, a platform positioned in the interior volume of the container, and a bag filter extending through a hole in the platform. The platform is positioned in a location above a bottom of the container. The bag filter has an inlet and an outlet. The inlet is positioned at or above the top surface of the platform. The outlet of the bag filter is positioned below the top surface of the platform such that when a fluid passes through the fluid inlet of the container and flows through the inlet of the bag filter, the fluid will pass outwardly of the outlet of the bag filter so as to flow toward the fluid outlet of the container.

In an embodiment of the present invention, a retainer plate is positioned over the platform. The retainer plate has an orifice opening to the inlet of the bag filter. The bag filter has a flange at an upper end thereof. This flange is interposed between the platform and the retaining plate.

The container has a channel formed or affixed thereto. This channel has one end opening to the fluid outlet of the container. The bag filter has sides or walls that extended generally transverse relationship to the longitudinal axis of the channel. The channel is positioned above the bottom of the container so as to define a chamber between the channel and the bottom of the container. The channel has an opening with a valve therein. This valve allows fluid communication between the channel and the chamber when in a first position and blocks fluid communication between the channel and the chamber wherein a second position. In particular, this valve can be in the nature of a float valve which seals when a level of fluid below the float is elevated.

The fluid inlet of the container is positioned at a level above a level of the inlet of the bag filter and above a top of the platform. The fluid outlet of the container is at a level below a level of the fluid inlet and below the top of the platform. The fluid inlet is positioned at one side of the container. The fluid outlet is positioned at the opposite side of the container.

In the preferred embodiment of the present invention, the platform as a plurality of holes formed therein. The bag filter comprises a plurality of bag filters respectively received in the plurality of holes. The retaining plate comprises a plurality of retaining plates that are arranged over the platform. Each of the retained plurality of retaining plates has an area less than an area of the platform.

The container has a lower outlet formed adjacent to the bottom of the container. The lower outlet is positioned at a level below a level of the fluid outlet of the container. A valve is positioned at this lower outlet. The valve is adapted to allow fluid to flow outwardly from the container. This valve is, in particular, a gate valve. This gate valve has an actuator which has a portion positioned at a location above the bag filter. The actuator is adapted to adjust the size of an orifice of the lower outlet.

The retainer plate has a line affixed thereto and extending upwardly therefrom. This line is adapted to allow removal of the retainer plate from the position overlying the platform.

A level sensor is positioned in the interior of the container above the bag filters. The level sensor is adapted to transmit a signal external of the container so as to indicate an overflow condition or a condition of the filter bags.

In one embodiment, the platform has an upper surface in sealed relation with an inner wall of the container such that fluid from the fluid inlet of the container can only flow downwardly through the bag filter. Alternatively, the platform can have a plurality of legs extending downwardly. The plurality of legs contacts the bottom of the container so as to support the platform at a desired distance above the bottom of the container.

Within the concept of the present invention, a cistern tank can be fluidically connected to the fluid outlet of the container. The cistern tank is adapted to receive the fluid filtered by the bag filter.

This foregoing Section is intended to describe, with particularity, the preferred embodiments of the present invention. It is understood that modifications to these preferred embodiments can be made within the scope of the present claims As such, this Section should not to be construed, in any way, as limiting of the broad scope of the present invention. The present invention should only be limited by the following claims and their legal equivalents.

DETAILED DESCRIPTION OF THE INVENTION

Figure 1:
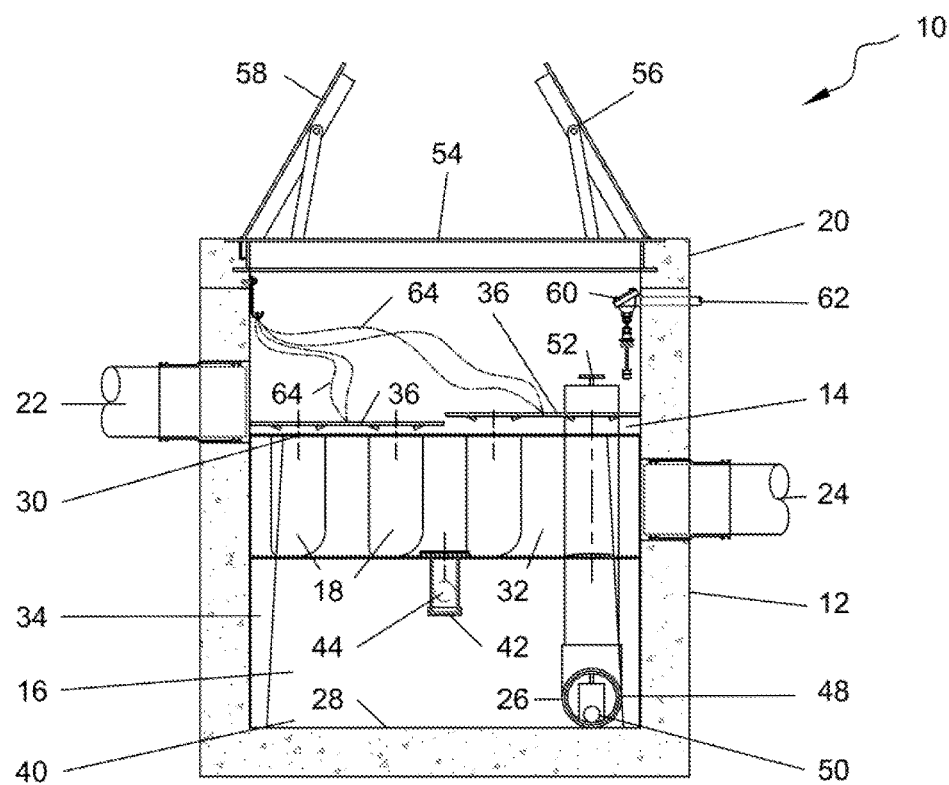
FIG. 1 is a cross-sectional view showing the bag filter apparatus in accordance with the preferred embodiment of the present invention.

Referring to FIG. 1, there is shown the filtering apparatus 10 in accordance with the preferred embodiment of the present invention. The filtering apparatus 10 includes a container 12, a platform 14 positioned within an interior volume 16 of the container 12, and at least one bag filter 18 extending through a hole in the platform 14. As can be seen in FIG. 1, the container 12 is in the nature of a subgrade vault that is illustrated as positioned below the grade 20. Alternatively, the container 12 can be a filtering apparatus that is positioned above grade. In other circumstances, the filtering apparatus 10 can be part of a stage of a continuous and progressive filtering system. The container 12 includes a fluid inlet 22, a fluid outlet 24, and a lower outlet 26. The platform 14 as illustrated as positioned within the interior volume 16 of the container 12 in a location above the bottom 28 of container 12. The plate 14 is illustrated as having a plurality of holes 30 formed therethrough. The bag filter 18 will extend through one of the holes 30 of the platform 14. The bag filter will have an inlet at the upper end thereof and an outlet. The outlet is formed through the sides or walls of the bag filter 18. The inlet of the bag filter 18 will be positioned at or above a top surface of the platform 14. The outlet of the bag filter 18 is positioned below the top surface of the platform 14. As a result, a fluid passing through the fluid inlet 22 will flow into the inlet of the bag filter 18 and outwardly through the outlet of the bag filter 18 so as to flow toward the fluid outlet 24 of the container 12. In particular, as can be seen in FIG. 1, this fluid will flow through a channel 32 formed within the interior 16 of the container 12. The channel 32 can be mounted to the side walls of container 12 in a generally fluid-tight relation so that water will not flow between the inner sides of the container 12 and the ends of the channel 32. In the embodiment shown in FIG. 1, a plurality of legs 34 will support the channel 32 and/or the platform 14 a desired distance above the bottom 28 of the container 12.

At least one retainer plate 36 is positioned over the platform 14. As will be described hereinafter, the retainer plates 36 will have an orifice formed therein which opens to the inlet of the bag filter 18. The bag filters 18 will have a flange at an upper end thereof. This flange will be interposed between the platform 14 and the retainer plate 36.

The channel 32 has an end opening to the fluid outlet 24 of the container 12. The bag filters 18 have sides or walls that extend in generally transverse relationship to a longitudinal axis of the channel 32. The channel 32 is spaced from the bottom 28 of container 12 so as to define a chamber 40 therebetween. The channel 32 has an opening 42 formed at a bottom thereof. Opening 42 will open to the chamber 40. A float valve 44 is positioned within the opening 42. In normal use, when a "first flush" of fluid passes through the fluid inlet 22, into the inlet of the bag filters 18 and outwardly of the outlet of the bag filters 18, this filtered fluid flow will initially pass through the opening 42 downwardly into the chamber 40. This first flush will fill the chamber 40 until the float valve 44 rises so as to seat adjacent to the bottom of the channel 32 and prevent further discharge of this fluid flow into the chamber 40.

This "first flush" is important since the first flush will usually contain a larger amount of debris than later water flow. For example, when rainwater initially flows off a surface, there will be material accumulations on the surface. As such, this first flush of this water will contain a large amount of debris. It is this first flush that will be discharged into the sewer system rather than passing outwardly to the outlet 24 to other locations, such as a cistern. When the chamber 40 receives this first flush of water, a valve 48 associated with the lower outlet 26 can allow the first flush to pass outwardly into the sewer system.

When the particulate-containing fluid enters the fluid inlet 22, and when the float valve 44 is in its position closing the channel 32, the flow of fluid (after the "first flush") of relatively clean fluid will pass from the fluid inlet 22 into the bag filters 118 and continue to flow along the channel 32 until the fluid reaches the fluid outlet 24. As such, the present invention serves to distinguish the "first flush" from subsequent flows. As such, heavy particulates can be discharged into the sewer system while the lighter particulate-containing or cleaned fluid can flow from the fluid outlet 24 to a connected cistern, an external container, a surface, a receptacle, or a body of water.

Importantly, in the present invention, there is a gate valve 50 that is cooperative with the lower outlet 48. An actuator 52 is cooperative with the gate valve 50 so as to regulate the size of the opening for fluids exiting through the lower outlet 26. The actuator 52 can be a hand-type control knob which can be actuated at a location above the platform 14 and above the retainer plates 36. The rotation of the actuator 52 from one position to another will suitably adjust the size of the fluid-releasing outlet lower outlet 26. The actuator 52 is in a location available for easy access through a hatch 54 formed in the container 12. The hatch 54 is common to various containers, such as vaults, tanks, receptacles, and other items. A pair of pivoting panels 56 and 58 are movable so as to open and close the hatch 54.

A level sensor 60 is positioned within the interior volume 40 of the container 12 in a location above the platform 14 and above the retainer plates 36. Level sensor 60 can communicate through a conduit 62 to the exterior of the container 12 so as to transmit signals to an alarm, a control panel, a monitor, or other humanly-perceivable display. If the level of fluid within the interior volume 40 of the container 12 reaches the level of the level sensor 60, an alarm can be activated so as to notify the user that an overflow condition has occurred. This "overflow" condition would occur under those circumstances where the flow rate through the inlet 22 becomes too great and/or under those circumstances where the bag filters 18 become clogged. The clogging of the bag filters 18 will prevent the desired fluid flow of fluid outwardly of the fluid outlet 24.

In order to install the bag filters 18, it is only necessary to lift the retainer plates 36 upwardly. This can be achieved through the use of the lines 64 that are affixed to each of the retainer plates. For example, a user can grasp one of the lines 64 and simply pull upwardly and/or outwardly so as to separate the retainer plates 36 from their position over the top of the bag filters 18. A special tool can be utilized so as to grasp each of the bag filters 18 and to lift such bag filters upwardly through the holes in the platform 14 and outwardly through the hatch 54 of the apparatus 10. After the filter bags 18 have been removed, it is desirable to place new or clean filter bags back into the original position. This is simply and easily done by sliding the filter bags through the holes of the platform 14 such that the flange of such bags resides on the top surface of the platform 14. The retainer plates 36 are then moved back downwardly through the use of line 64 so as to reside in a compressive relationship over the flanges of each of the filter bags 18. At this time, the installation is complete and the apparatus 10 is now available for use. As such, this greatly simplifies the installation and removal of the filter bags in the apparatus 10 of the present invention.

Figure 2:
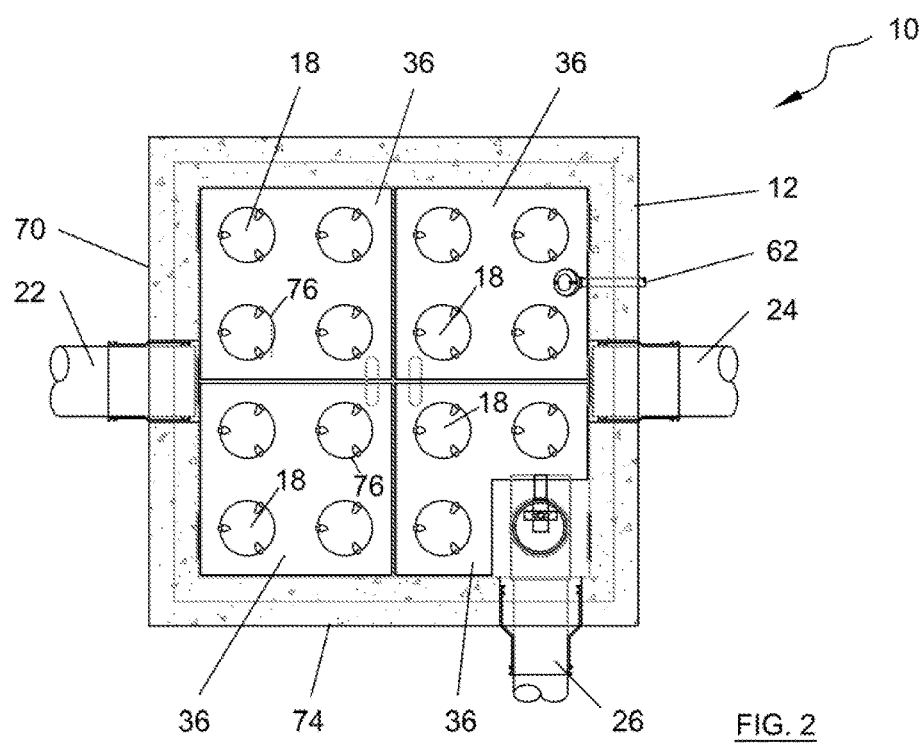
FIG. 2 is a cross-sectional plan view showing the bag filter apparatus of the preferred embodiment of the present invention.

FIG. 2 is a plan view showing the filter apparatus 10 of the present invention. It can be seen that the container 12 has the fluid inlet 22 at one side 70 and the fluid outlet 24 at an opposite side 72 thereof. The lower outlet 26 is illustrated as located adjacent to the bottom 28 of the container 12 and extends outwardly of another wall 74.

FIG. 2 shows that the retainer plates 36 are positioned over the filter bags 18. In particular, each of the retainer plates 36 includes an orifice 76 which opens to the inlet of the filter bags 18. Ideally, the diameter of the orifice 76 will be less than the diameter of the flange of each of the filter bags 18 and/or less than the outer diameter of the holes 30 that are used to receive the filter bags 30 within the platform 14. Each of the retainer plates 36 has an area that is less than an overall area of the platform 14. This is carried out to reduce weigh and to enhance the ability of users to lift. As such, rather than lifting a very large retainer plate 36, smaller sections of retainer plates 36 can be individually lifted. This further enhances the convenience of installing the filter bags 18 in their desired positions.

Figure 3:
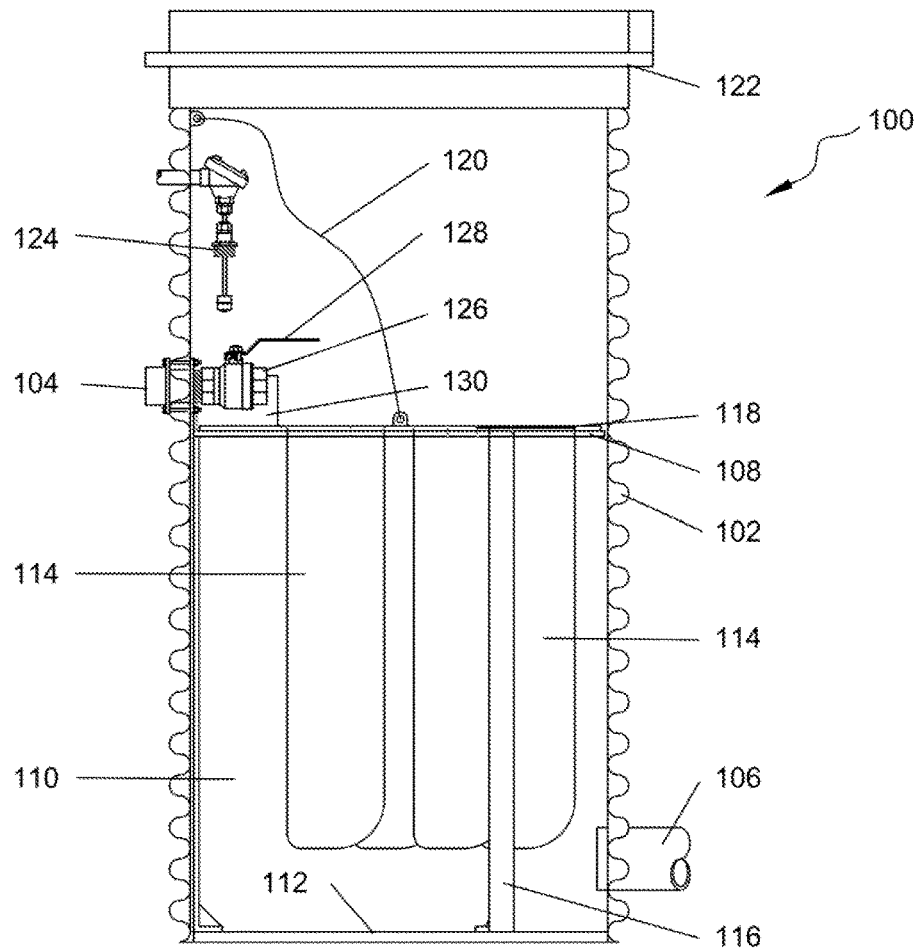
FIG. 3 is a cross-sectional view showing an alternative embodiment of the bag filter apparatus of the present invention.

FIG. 3 shows an alternative embodiment of the filter apparatus 100 of the present invention. This filtering apparatus 100 can be used as a polishing filter assembly that can be incorporated in-line with the filter apparatus 10 or with other filtering systems.

In FIG. 3, it can be seen that the filtering apparatus 100 includes a container 102, a fluid inlet 104 and a fluid outlet 106. A platform 108 is positioned within the interior volume 110 of the container 102. Platform 108 is positioned within the interior volume 110 of the container 102 in a location above the bottom 112 of container 102. A plurality of filter bags 114 are inserted through holes formed in the platform 108. These filter bags 114 will extend substantially downwardly in a direction toward the fluid outlet 106. The platform 108 is supported within the interior volume 110 of container 102 by legs 116.

A retainer plate 118 is positioned over the tops of the filter bags 114 in the same manner as described hereinbefore in connection with FIGS. 1 and 2. A line 120 has one end affixed to the retainer plate 118 and an opposite end affixed to an internal side wall of the container 102. This line 120 is located adjacent to the access cover 122 of the apparatus 100. A level sensor 124 is provided within the interior volume 110 of the container 102 in a location above the retainer plate 118 and above the filter bags 114. The level sensor 124 will monitor the level of fluid within the interior volume 110 in the same manner as described hereinbefore in association with the previous embodiment.

The fluid inlet 104 includes an end 126 that extends inwardly from the side wall of the container 102. As such, as fluid passing through the fluid inlet 104 is directed toward a top of the retainer plate 108 so that the fluid will flow downwardly through the inlet of the filter bags 114. The filter bags 114 will collect particulate matter therein. As such, a polished fluid will exit the filter bags 114 so as to be directed from the container 102 outwardly through fluid outlet 106. This filtered fluid can then be passed for other uses or locations, such as a cistern. An arm 128 is operatively connected to the fluid inlet 104 so as to allow the user to adjust the flow rate of fluids through the fluid inlet 104. A valve shield 130 is provided adjacent to the interior end of the fluid inlet 104 so as to protect the valve and the arm 102 during the removal of the retainer plate 118. As such, the sensitive valve on the interior end of the fluid inlet 104 can be effectively protected from any damaging contact as a result of the lifting of the retainer plate 118 from the top of the filter bags 114 and from the top of the platform 108.

Figure 4:
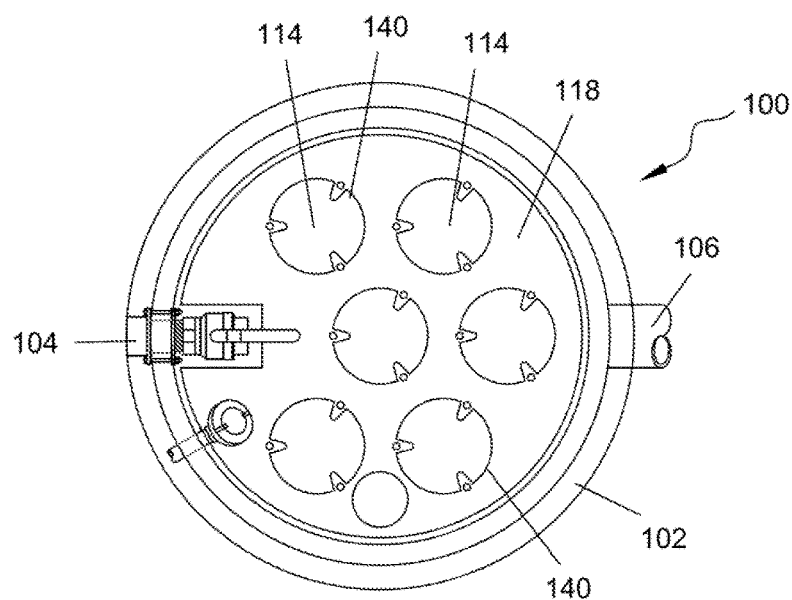
FIG. 4 is a cross-sectional plan view showing the alternative embodiment of the present invention of FIG. 3.

FIG. 4 illustrates the configuration of the apparatus 100 of this alternative embodiment. As can be seen, there are a plurality of orifices 140 formed through the retainer plate 118. These orifices 140 will open into the interior of the filter bags 114. As such, when fluid passes into the interior of the container 102 through the fluid inlet 104, it will flow, by gravity, through the orifices 140 and into the interior of the filter bags 114 for the purposes of filtering. Ultimately, the fluid outlet 106 is illustrated as located diametrically opposed, or on the opposite side of the container, from the fluid inlet 104. This large flow path assures further distribution of the fluid across the surfaces of the retainer plate 118 and through the interiors of the various filter bags 114.

Figure 5:
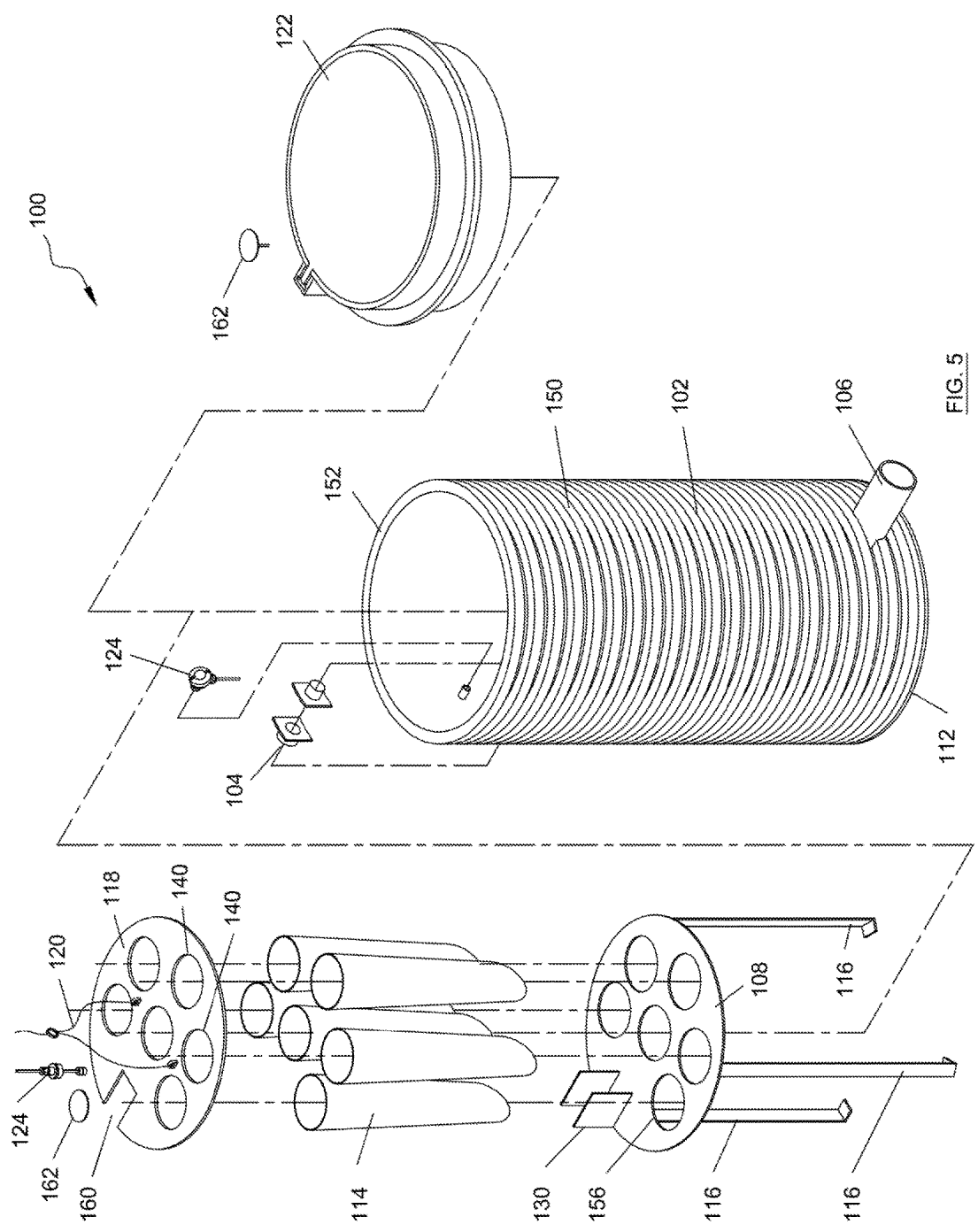
FIG. 5 is an exploded view of the alternative embodiment of the present invention, as shown in FIGS. 3 and 4.

FIG. 5 is an exploded illustration of the filtering apparatus 100. Initially, it can be seen that the container 102 is of a tubular or cylindrical configuration having a corrugated outer wall 150. The fluid outlet 106 is located adjacent to the bottom 112 of the container 102. The fluid inlet 104 is illustrated as formed through the wall of the container 102 generally at a location slightly spaced from the top 152 of container 102. The valve 126 will be connected to the fluid inlet 104 so as to allow for the adjustable control of fluid passing through the fluid inlet 104.

The platform 108 has a plurality of legs 116 extending downwardly therefrom. These legs 116 will support the platform 108 in an elevated position above the bottom 112 of the container 102. A plurality of holes 156 are formed through the platform 108. The valve shield 130 is affixed to the top surface of the platform 108. The valve shield 130 comprises a pair of spaced-apart plates. As such, the valve 152 will reside in the area between the parallel plates of the valve shield 130.

A plurality of filter bags 114 are illustrated as arranged so as to extend through the various holes 156 of the platform 108. The retaining plate 118 will ultimately reside at or above the filter bags 114 so as to retain the filter bags 114 in a position supported above the bottom 112 of the container 102. The retaining plate 118 has a plurality of orifices 140 formed therethrough. These orifices 140 will respectively correspond in location to the holes 156 formed in the platform 108. The retaining plate 118 includes a notch 160 which will generally extend about the exterior of the pair of plates of the valve shield 130. A badge 162 and the level sensor 124 are illustrated in a position located above the retaining plate 118. The line 120 extends in the form of a harness from the retaining plate 118 upwardly. The line 120 includes a pair of leads that extend downwardly to spaced-apart locations on the top surface of the retaining plate 118.

The access cover 122 is illustrated as being positioned above the upper end 152 of the container 102 following the introduction of the platform 108, the filter bags 114 and retaining plate 118 within the container 102.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. An apparatus for filtering a fluid, the apparatus comprising:
    a container having a fluid inlet and a fluid outlet and an interior volume;
    a platform positioned in said interior volume of said container, said platform positioned at a location above a bottom of said container, said platform having at least one hole formed therethrough;
    a channel affixed or formed in said container, said channel positioned below said platform, said channel positioned above the bottom of said container so as to define a lower chamber between said channel and said bottom of said container, said channel having an opening with a float valve therein, said float valve allowing fluid communication between said channel and said lower chamber in a first position and blocking fluid communication between said channel and said lower chamber in a second position, said float valve in said first position so as to drain the fluid communication from said channel to said lower chamber until said lower chamber fills so as to drain a firs flush of the fluid toward said sewer; and
    a bag filter extending through the hole of said platform, said bag filter having an inlet and an outlet, said inlet positioned at or above the top surface of said platform, said outlet of said bag filter positioned below said top surface of said platform such that a fluid passing through said fluid inlet of said container flows into said inlet of said bag filter and outwardly of said outlet of said bag filter so as to flow toward said fluid outlet of said container.

2. The apparatus of claim 1, further comprising:
    a retainer plate positioned over said platform, said retainer plate having an opening to said inlet of said bag filter.

3. The apparatus of claim 2, said bag filter having a flange at an upper end thereof, said flange interposed between said platform and said retainer plate.

4. The apparatus of claim 1, said channel having one end opening to said fluid outlet of said container, said bag filter having sides extending in generally transverse relation to a longitudinal axis of said channel.

5. The apparatus of claim 1, said fluid inlet of said container positioned at a level above a level of said inlet of said bag filter and above a top of said platform, said fluid outlet of said container being at a level below a level of said fluid inlet and below said top of said platform.

6. The apparatus of claim 1, said fluid inlet positioned at one side of said container and said fluid outlet positioned on an opposite side of said container.

7. The apparatus of claim 1, said platform having a plurality of holes formed therein, said bag filter comprising a plurality of bag filters respectively received in said plurality of holes.

8. The apparatus of claim 2, said retainer plate comprising a plurality of retainer plates arranged over said platform, each of said plurality of retainer plates having an area less than an area of said platform.

9. The apparatus of claim 1, said container having a lower outlet formed adjacent said bottom of said container, said lower outlet positioned at a level below a level of said fluid outlet.

10. The apparatus of claim 9, further comprising:
    a valve positioned at said lower outlet, said valve adapted to allow fluid to flow outwardly from said container.

11. The apparatus of claim 10, said valve being a gate valve, said gate valve having an actuator positioned at a location above said bag filter, said actuator adapted to adjust the size of an opening of said lower outlet.

12. The apparatus of claim 2, said retainer plate having a line affixed thereto and extending upwardly therefrom, said line adapted to allow removal of said retainer plate from the position overlying said platform.

13. The apparatus of claim 1, further comprising:
a level sensor positioned in said interior of said container above said bag filter, said level sensor adapted to transmit a signal external of said container so as to indicate an overflow condition.

14. The apparatus of claim 1, said platform having an upper surface in sealed relation within inner wall of said containers such that fluid from said fluid inlet can only flow downwardly through said bag filter.

15. The apparatus of claim 1, said platform having a plurality of legs extending downwardly, said plurality of legs contacting said bottom of said container so as to support said platform a desired distance above said bottom of said container.

16. The apparatus of claim 1, further comprising:
a cistern tank fluidically connected to said fluid outlet of said container, said cistern tank adapted to receive the fluid filtered by said bag filter.

17. An apparatus for filtering a fluid, the apparatus comprising:
a container having a fluid inlet and a fluid outlet and interior volume;
a channel affixed within said interior volume of said container, said channel having at least one hole formed at an upper side thereof, said channel having one end opening to said fluid outlet of said container, said channel positioned above the bottom of said container so as to define a lower chamber between said channel and said bottom of said container, said channel having an opening with a float valve therein, said float valve allowing fluid communication between said channel and said lower chamber in a first position and blocking fluid communication between said channel and said lower chamber in a second position, said float valve in said first position so as to drain the fluid communication from said channel to said lower chamber until said lower chamber fills so as to drain a firs flush of the fluid toward said sewer; and
a bag filter extending through the hole of said channel, said bag filter having an inlet and an outlet, said inlet positioned at or above said upper side of said channel, said outlet of said bag filter positioned below said upper side of said channel, said bag filter having sides extending in generally transverse relation to a longitudinal axis of said channel, a fluid passing through said fluid inlet of said container flows into said inlet of said bag filter and outwardly of said outlet of said bag filter so as to flow through said channel toward said fluid outlet of said container.

18. The apparatus of claim 17, further comprising:
a retainer plate positioned over said channel, said retainer plate having an orifice opening to said inlet of said bag filter.

* * * * *